(12) United States Patent
Venkatraman et al.

(10) Patent No.: US 9,641,983 B2
(45) Date of Patent: May 2, 2017

(54) LOCATION MANAGEMENT FOR ACCESS POINTS

(71) Applicant: Verizon Patent and Licensing Inc., Arlington, VA (US)

(72) Inventors: Shankar Venkatraman, San Jose, CA (US); Mingxing S. Li, San Jose, CA (US); Jeffrey Torres, Boonton, NJ (US); Roya T. Esfandi, Allen, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 14/869,060

(22) Filed: Sep. 29, 2015

(65) Prior Publication Data

US 2017/0094470 A1 Mar. 30, 2017

(51) Int. Cl.
*H04W 4/02* (2009.01)
*H04W 24/08* (2009.01)

(52) U.S. Cl.
CPC ........... *H04W 4/025* (2013.01); *H04W 24/08* (2013.01)

(58) Field of Classification Search
CPC ..... H04W 24/08; H04W 4/025; H04W 64/00; H04W 4/02; H04W 24/00; H04W 64/003
See application file for complete search history.

(56) References Cited

U.S. PATENT DOCUMENTS

| | | | |
|---|---|---|---|
| 2004/0176040 A1* | 9/2004 | Thornton | H04W 24/08 455/67.11 |
| 2009/0182862 A1* | 7/2009 | Thomson | H04W 24/08 709/224 |
| 2010/0159885 A1* | 6/2010 | Selgert | G01S 5/0072 455/412.1 |

* cited by examiner

*Primary Examiner* — Magdi Elhag

(57) ABSTRACT

A device may determine a first baseline measurement. The device may determine a first location associated with the device. The device may store information identifying the first baseline measurement and the first location associated with the device. The device may determine a second baseline measurement. The device may determine that the second baseline measurement differs from the first baseline measurement by a threshold quantity. The device may determine a second location associated with the device based on determining that the second baseline measurement differs from the first baseline measurement by the threshold quantity. The second location may be different from the first location. The device may provide information associated with the second baseline measurement and/or the second location.

20 Claims, 8 Drawing Sheets

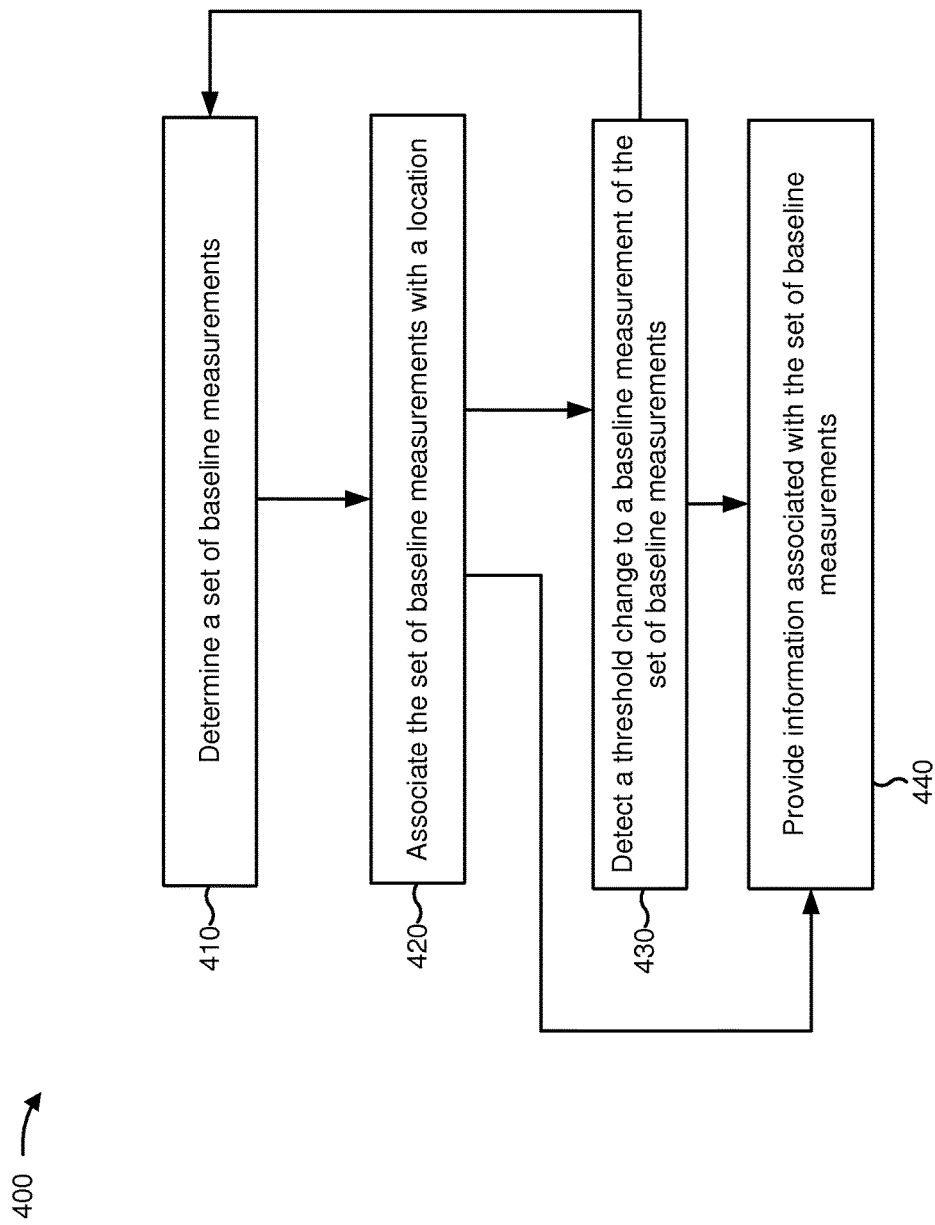

LOCATION MANAGEMENT FOR ACCESS POINTS

BACKGROUND

An access point may be deployed in a location that lacks access to a global positioning system (GPS) signal or that has poor availability of a GPS signal, such as an urban location, an indoor location, or the like. The access point may be provided with location information describing a location at which the access point is deployed, such as information identifying a street address, a floor, a room, or the like. Location information associated with an access point is important in determining appropriate spectrum usage, ensuring equipment security, and providing enhanced 9-1-1 (E911) services to user devices.

BRIEF DESCRIPTION OF THE DRAWINGS

FIG. 4 is a flow chart of an example process for managing location information associated with an access point.

DETAILED DESCRIPTION OF PREFERRED EMBODIMENTS

The following detailed description of example implementations refers to the accompanying drawings. The same reference numbers in different drawings may identify the same or similar elements.

An access point may be deployed in a particular location for which a global positioning system (GPS) signal is unavailable or unreliably available for utilization in determining location information. The access point may be provided with location information during installation of the access point. For example, an installation technician may provide information identifying a street address, a floor number, a room number, or the like to configure the access point when installing the access point. Location information may be utilized in spectrum validation, maintenance of equipment security, support for enhanced 9-1-1 (E911) services, or the like. Periodically, maintenance personnel may be deployed to verify that the access point has not been moved to another location. However, deploying maintenance personnel to verify a location of an access point and/or provide updated location information may be time-consuming, inaccurate, and subject to scheduling difficulties. Implementations, described herein, may facilitate maintenance of location information for an access point by utilizing a set of baseline measurements to identify a change to a location of the access point. In this way, an access point detects a change to a location and triggers an alert and/or a determination of a new location of the access point.

FIGS. 1A-1E are diagrams of an overview of an example implementation 100 described herein. FIGS. 1A-1E show an example of managing location information associated with an access point.

Figure 1A:
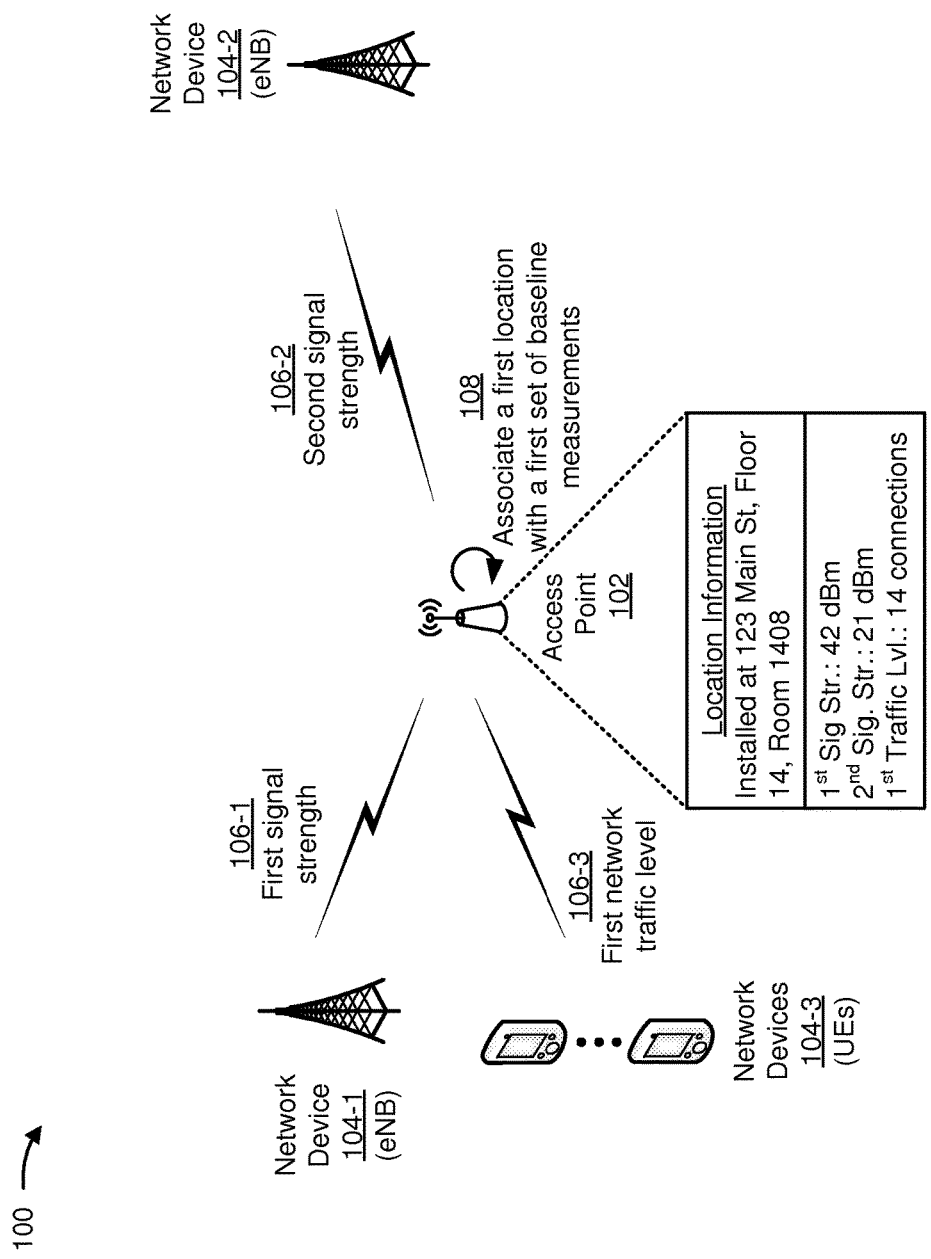
FIGS. 1A-1E are diagrams of an overview of an example implementation described herein.

As shown in FIG. 1A, example implementation 100 may include an access point 102, a first network device 104-1 (e.g., an eNodeB (eNB)), a second network device 104-2 (e.g., an eNB), and a set of third network devices 104-3 (e.g., a set of user equipments (UEs)). As shown by reference number 106-1, access point 102 may determine a first baseline measurement 106-1, such as a first signal strength associated with network device 104-1. As shown by reference number 106-2, access point 102 may determine a second baseline measurement 106-2, such as a second signal strength associated with network device 104-2. As shown by reference number 106-3, access point 102 may determine a third baseline measurement 106-3, such as a first network traffic level associated with the set of third network devices 104-3 (e.g., a quantity of UEs connected to access point 102). Collectively, baseline measurements 106-1, 106-2, and 106-3 may be termed a first set of baseline measurements.

Assume that access point 102 includes stored location information identifying an address (e.g., "123 Main St"), a floor number (e.g., "Floor 14"), and a room number (e.g., "Room 1408") at which access point 102 is installed. As shown by reference number 108, access point 102 may associate the first location with the first set of baseline measurements. Assume that access point 102 is moved from the first location to a second location.

Figure 1B:
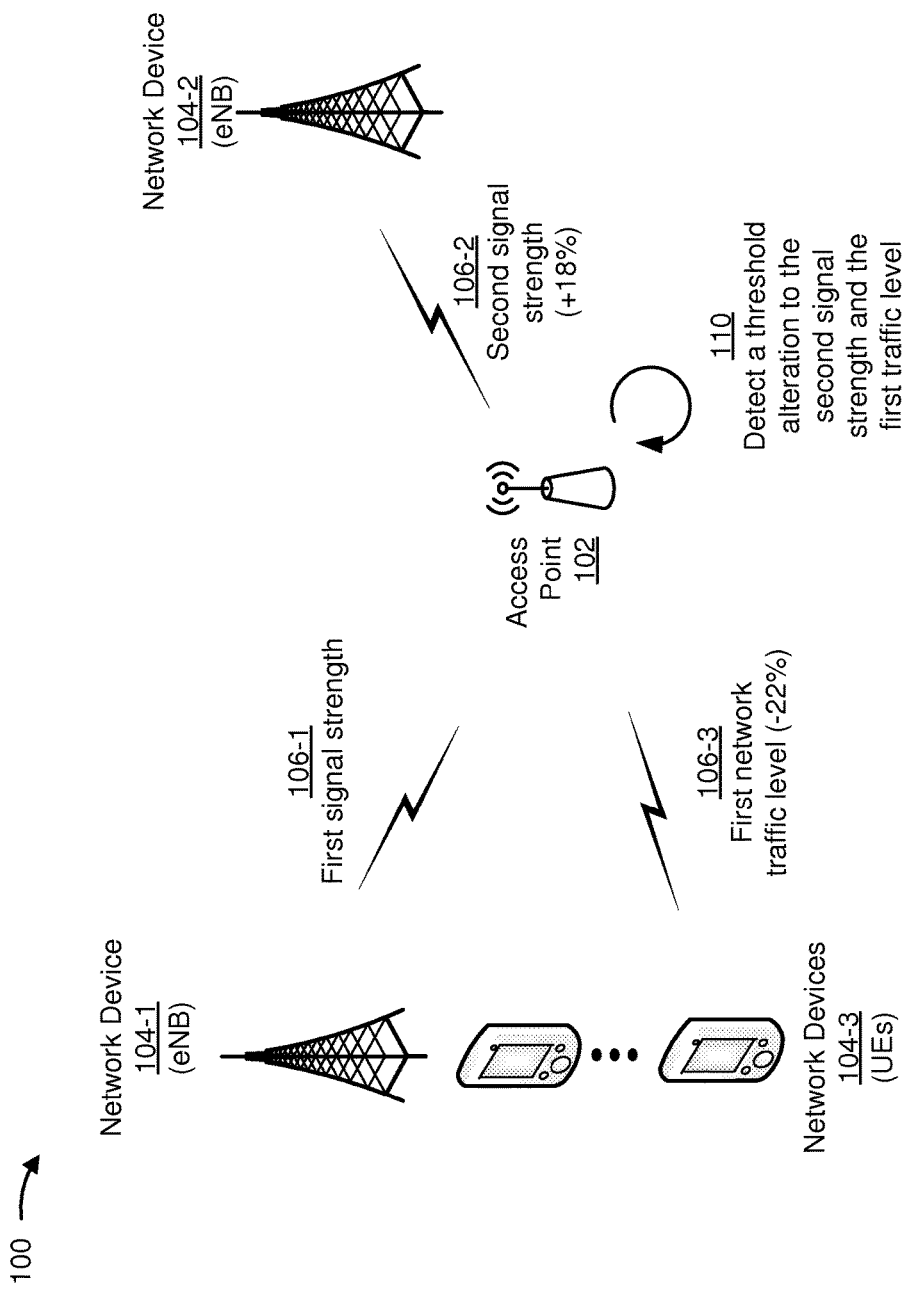

As shown in FIG. 1B, and by reference number 110, access point 102 may detect a threshold alteration to one or more baseline measurements of the set of baseline measurements. For example, access point 102 may detect an 18% increase to the second signal strength. Similarly, access point 102 may detect a 22% reduction to the first network traffic level. Assume that the 18% increase to the second signal strength exceeds a threshold alteration to a signal strength associated with determining that access point 102 has moved from the first location to a second location and/or that the 22% reduction to the first network traffic level exceeds a threshold alteration to a network traffic level associated with determining that access point 102 has moved from the first location (e.g., to another location). In another example, access point 102 may detect another type of signal, another network device 104-3 of the set of network devices 104-3, or the like as an alteration to the set of baseline measurements. In this way, access point 102 may determine that access point 102 has been moved from the first location. In another example, access point 102 may provide information and/or trigger an alert associated with determining that access point 102 has been moved from the first location.

Figure 1C:
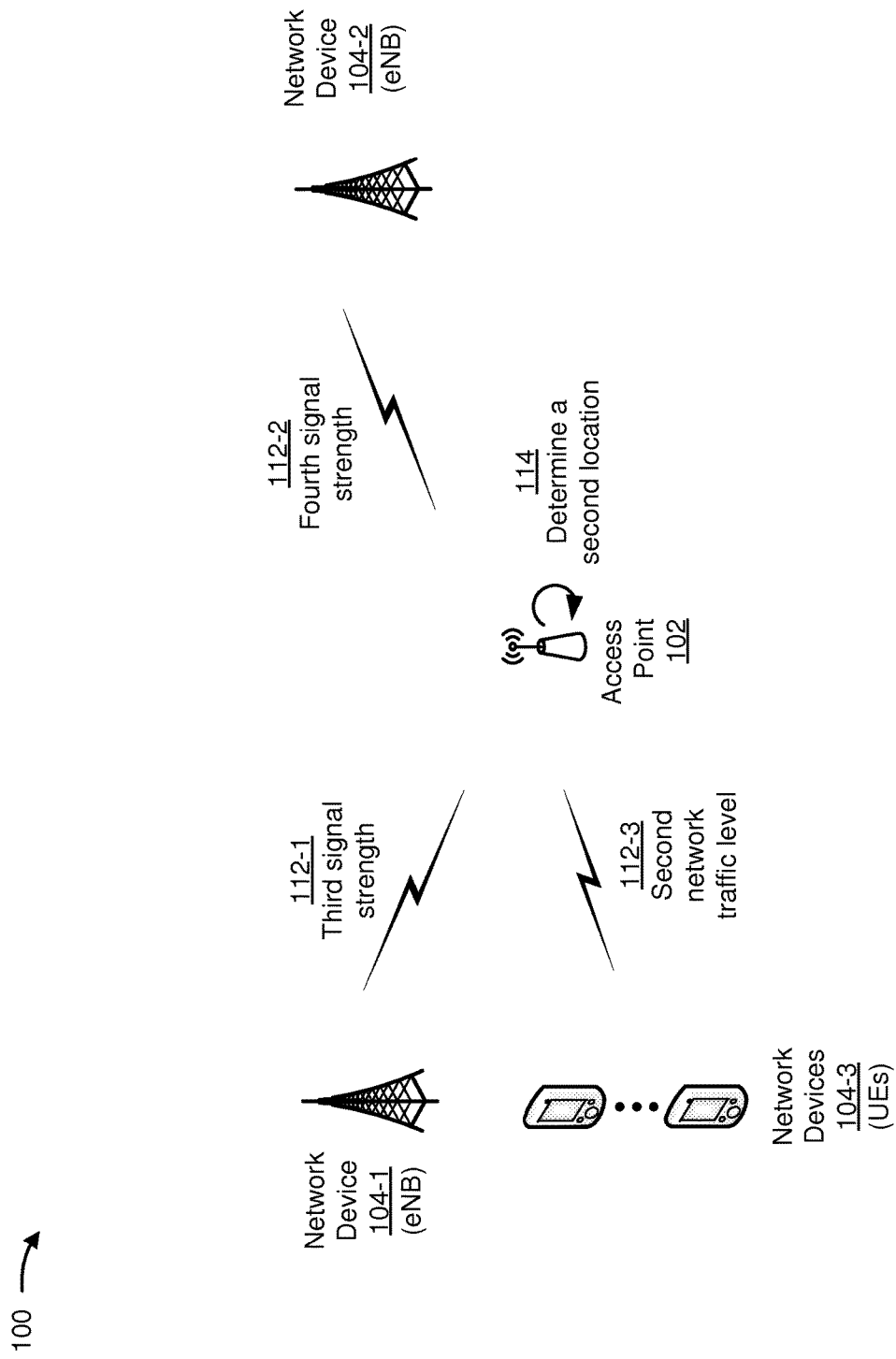

As shown in FIG. 1C, based on determining that access point 102 has been moved from the first location, access point 102 may determine a second set of baseline measurements. As shown by reference number 112-1, access point 102 may determine a fourth baseline measurement 112-1, such as a third signal strength measurement associated with network device 104-1. As shown by reference number 112-2, access point 102 may determine a fifth baseline measurement 112-2, such as a fourth signal strength associated with network device 104-2. As shown by reference number 112-3, access point 102 may determine a sixth baseline measurement 112-3, such as a second network traffic level associated with the set of third network devices 104-3. Collectively, baseline measurements 112-1, 112-2, and 112-3 may be termed the second set of baseline measurements.

As further shown in FIG. 1C, and by reference number 114, access point 102 may identify a second location to which access point 102 has moved. For example, access point 102 may provide an alert to cause a set of maintenance personnel to be deployed to provide information identifying the second location. Additionally, or alternatively, access point 102 may determine the second location based on performing a triangulation technique using one or more detected signals, requesting location information from one or more network devices 104, utilizing a GPS module (e.g., when a GPS signal is available), or the like.

In another example, access point 102 may determine the second location based on other address information (e.g., a street identifier, floor identifier, room identifier, or the like associated with another access point). For example, access point 102 may identify a set of access points with signal strengths that satisfy a threshold and that share the same street identifier, and may determine that access point 102 is associated with the same street identifier. In this case, access point 102 may classify a location of access point 102 as being within a particular proximity of the street identifier, floor identifier, and/or room identifier of an access point of the set of access points.

Figure 1D:
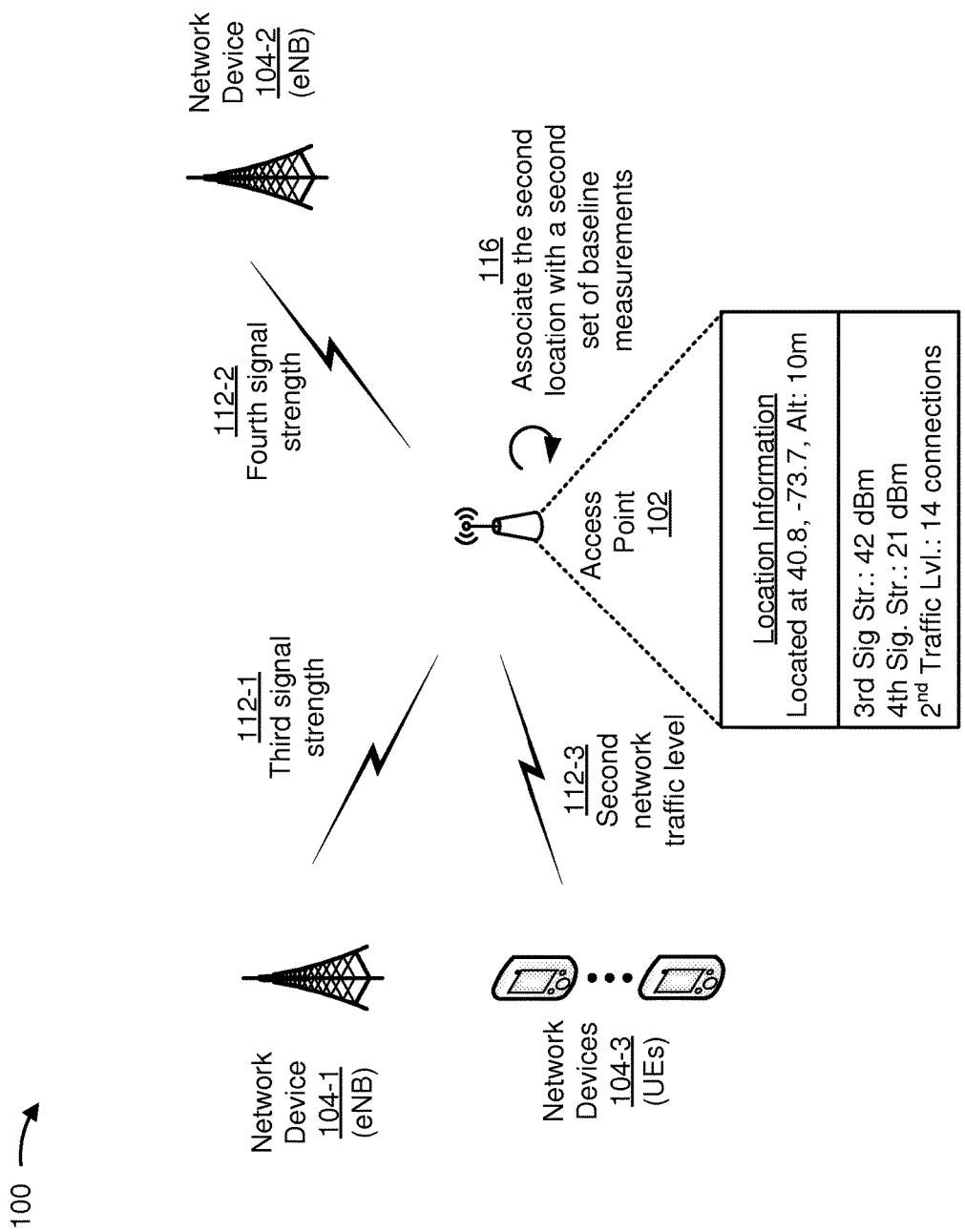

As shown in FIG. 1D, and by reference number 116, access point 102 may associate the second location with the second set of baseline measurements. For example, access point 102 may store information identifying the second set of baseline measurements for the second location. In another example, access point 102 may provide information identifying the second location and/or the second set of baseline measurements, thereby facilitating equipment security, equipment tracking, network provisioning, or the like.

Figure 1E:
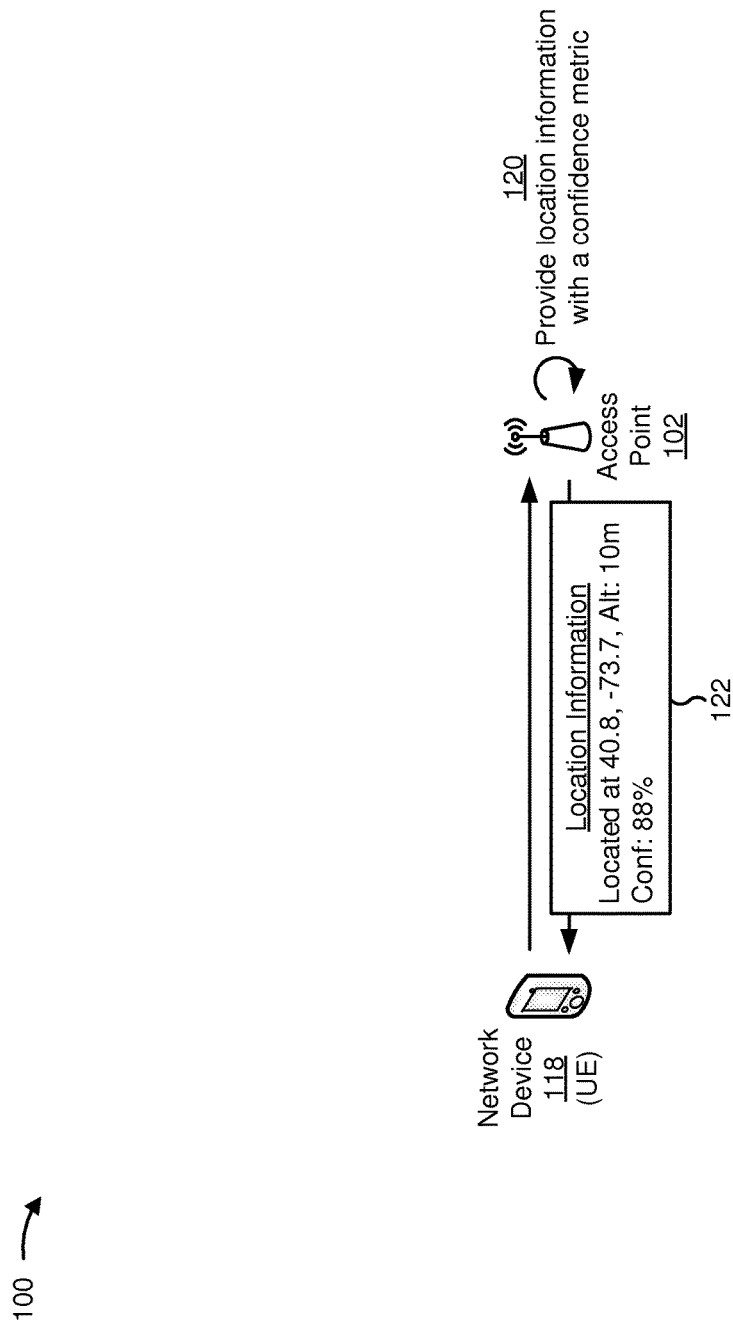

As shown in FIG. 1E, another network device 118 (e.g., a UE) may request location information from access point 102. As shown by reference number 120, access point 102 may provide the location information, and may provide a confidence metric associated with the location information. For example, access point 102 may determine a confidence metric associated with the second location, such as a confidence metric relating to an accuracy with which the location information was determined, a confidence metric relating to a reliability of information from which the location information was determined, a confidence metric relating to a confidence in determining that access point 102 has moved from the first location to the second location, or the like. As shown by reference number 122, access point 102 provides location information identifying the second location (e.g., a set of latitude, longitude, and altitude coordinates) and the confidence metric (e.g., an "88%" confidence in the accuracy of the second location).

In this way, access point 102 may detect a change to a location, update the location, and provide information associated with the location. Moreover, by providing a confidence metric associated with location information identifying the location, access point 102 provides information that network device 118 can utilize when weighting location information from multiple sources to determine a location of network device 118, thereby reducing a likelihood that network device 118 determines an incorrect location.

Figure 2:
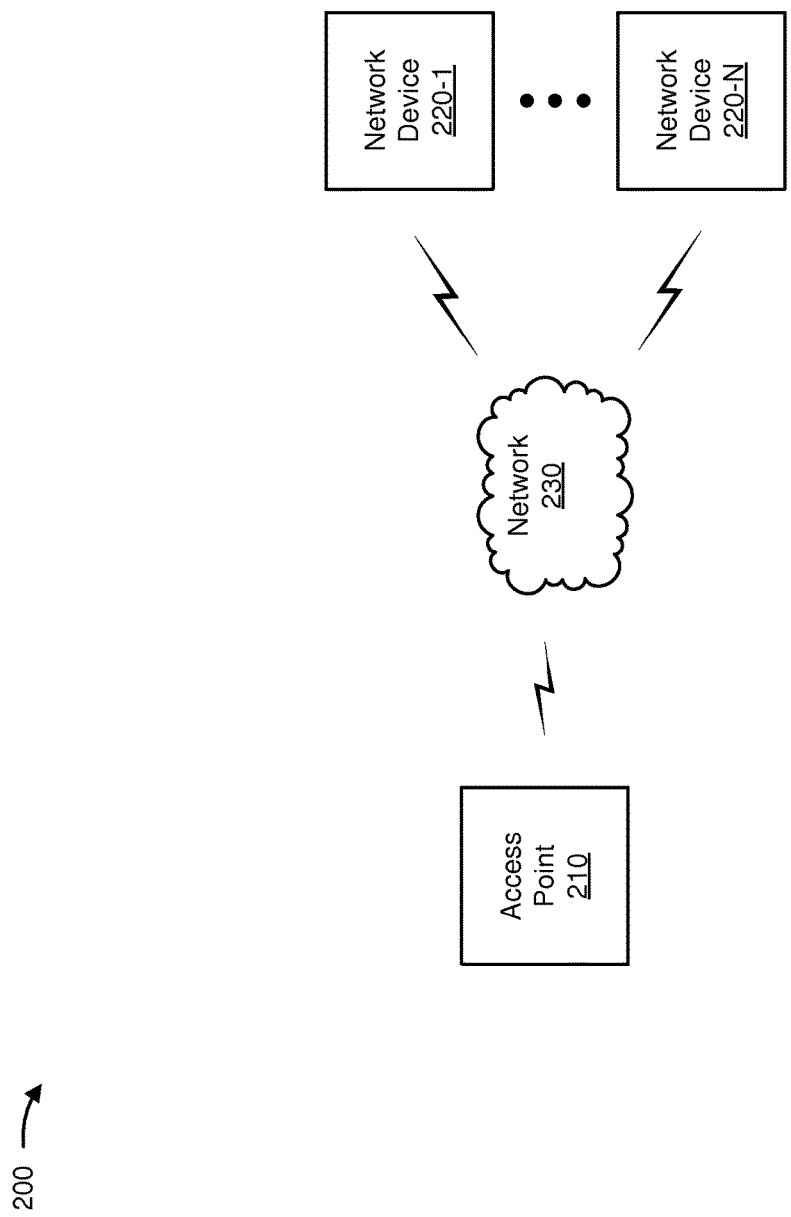
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include an access point 210, one or more network devices 220-1 through 220-N (N≥1) (hereinafter referred to collectively as "network devices 220," and individually as "network device 220"), and a network 230. Devices of environment 200 may interconnect via wired connections, wireless connections, or a combination of wired and wireless connections.

Access point 210 may include one or more devices capable of transferring traffic, such as audio, video, text, and/or other traffic, destined for and/or received from network device 220. In some implementations, access point 210 may include an eNB associated with a long term evolution (LTE) network. Additionally, or alternatively, access point 210 may be associated with a radio access network (RAN) that is not associated with an LTE network, such as a wireless local area network (WLAN) (e.g., a Wi-Fi access point), a 3G network (e.g., a 3G access point), or the like. In some implementations, access point 210 may be capable of performing a baseline measurement, such as determining a neighbor list, a signal strength, a network traffic level, or the like. In some implementations, access point 210 may include a first transceiver configured to perform the baseline measurement and a second transceiver configured to provide network connectivity to a set of network devices 220. Access point 210 may send traffic to and/or receive traffic from network device 220 via an air interface. In some implementations, access point 210 corresponds to access point 102 shown in FIGS. 1A-1E.

Network device 220 may include one or more devices capable of communicating wirelessly with access point 210. For example, network device 220 may include a user equipment (e.g., a wireless communication device, a radiotelephone, a personal communications system terminal, a smart phone, etc.), a computer (e.g., a laptop computer, a tablet computer, a wearable computer, etc.), a personal gaming system, an access point (e.g., a base station, an eNB, etc.), or the like. In some implementations, network device 220 may be capable of performing a baseline measurement. For example, network device 220 may be capable of determining a neighbor list, a signal strength, a network traffic level, or the like and transmitting the baseline measurement to access point 210. In some implementations, network device 220 corresponds to network device 104-1, network device 104-2, network devices 104-3, and/or network device 118 shown in FIGS. 1A-1E.

Network 230 may include one or more wired and/or wireless networks. For example, network 230 may include a cellular network (e.g., an LTE network, a 3G network, a code division multiple access (CDMA) network, etc.), a WLAN, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
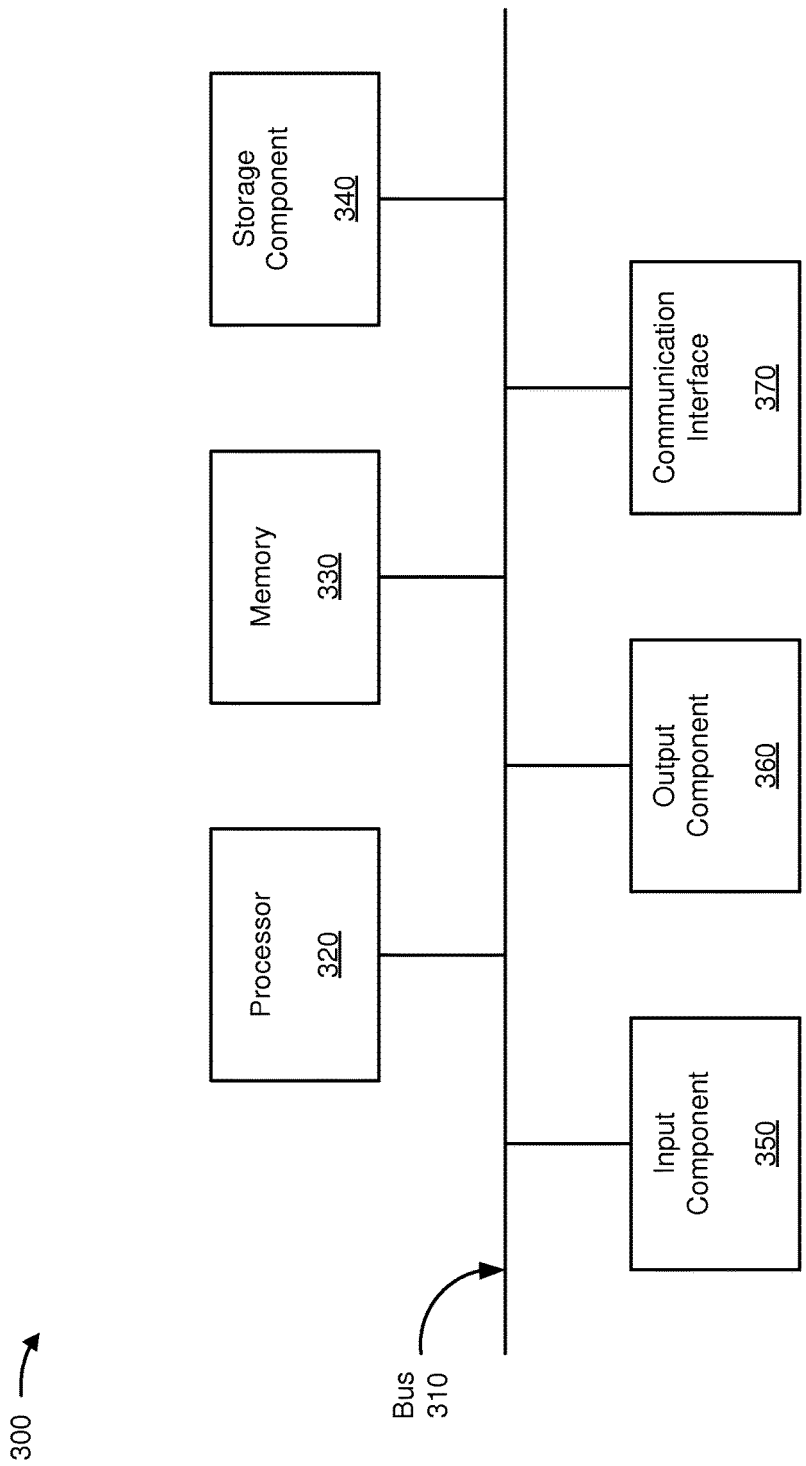
FIG. 3 is a diagram of example components of one or more devices of FIG. 2.

FIG. 3 is a diagram of example components of a device 300. Device 300 may correspond to access point 210 and/or network device 220. In some implementations, access point 210 and/or network device 220 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. In some implementations, processor 320 may include one or more processors capable of being programmed to perform a function. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for managing location information associated with an access point. In some implementations, one or more process blocks of FIG. 4 may be performed by access point 210. In some implementations, one or more process blocks of FIG. 4 may be performed by another device or a group of devices separate from or including access point 210, such as network device 220.

As shown in FIG. 4, process 400 may include determining a set of baseline measurements (block 410). For example, access point 210 may determine the set of baseline measurements. In some implementations, access point 210 may perform a set of measurements to determine the set of baseline measurements. For example, access point 210 may perform a signal strength measurement, a network traffic level measurement, or the like. In some implementations, access point 210 may determine information associated with a network traffic pattern when determining the set of baseline measurements. For example, access point 210 may determine a quantity of connection attempts, a quantity of handover attempts, a cell utilization, or the like. In some implementations, access point 210 may process information regarding a network connection when determining the set of baseline measurements. For example, access point 210 may detect a set of network devices 220 (e.g., a set of neighboring cells, eNBs, or the like), and may identify the set of network devices 220. Additionally, or alternatively, access point 210 may determine a neighbor list, an ordering of neighbor cells included in a neighbor list, or the like. In this way, access point 210 performs measurements and/or utilizes information regarding a network connection to establish the set of baseline measurements.

In some implementations, access point 210 may cause a particular network device 220 to perform a set of measurements to determine the set of baseline measurements. For example, access point 210 may cause the particular network device 220 to determine a signal strength associated with a signal provided by access point 210, and access point 210 may utilize the signal strength as a baseline measurement. Additionally, or alternatively, access point 210 may cause one or more network devices 220 (e.g., one or more UEs) to utilize a GPS functionality to determine location information and provide the location information to access point 210 to utilize as a baseline measurement. In this way, access point 210 obtains measurements from network devices 220 to establish the set of baseline measurements.

In some implementations, access point 210 may receive a set of expected measurements for utilization as the set of baseline measurements. For example, access point 210 may receive information identifying an expected neighbor list for access point 210 at a particular location in which access point 210 is to be installed. Additionally, or alternatively, access point 210 may receive information identifying a set of expected signal strengths associated with network devices 220 when access point 210 is installed at the particular location. In this case, access point 210 may compare one or more expected baseline measurements to one or more observed baseline measurements to perform a verification of whether an actual location at which access point 210 is installed is an intended location.

In some implementations, access point 210 may determine a second set of baseline measurements based on detecting a change to a first set of baseline measurements. For example, when access point 210 detects a threshold change to the first set of baseline measurements, access point 210 may be triggered to determine the second set of baseline measurements. In this case, the second set of baseline measurements may replace the first set of baseline measurements as baseline measurements associated with a location of access point 210.

As further shown in FIG. 4, process 400 may include associating the set of baseline measurements with a location (block 420). For example, access point 210 may associate the set of baseline measurements with the location. In some implementations, access point 210 may receive information identifying the location. For example, when access point 210 is installed at the location, access point 210 may receive information identifying the location (e.g., latitude, longitude, and altitude information; address information; or the like). In some implementations, access point 210 may determine the location. For example, access point 210 may perform triangulation, trilateration, multi-angulation, multi-lateration, or the like based on information received from a set of network devices 220 (e.g., location information, signal propagation information, etc.) to determine the location.

In some implementations, access point 210 may cause network device 220 to determine the location. For example, access point 210 may cause network device 220 to utilize a GPS functionality, perform triangulation, or the like to determine a location, and may receive information identifying the location from network device 220. In some implementations, access point 210 may receive information identifying the location from network device 220. For example, access point 210 may receive address information identifying a location of a static network device 220, may determine that static network device 220 is located within a particular proximity to access point 210, and may utilize the address information identifying the location of static network device 220 as address information identifying the location of access point 210.

In some implementations, access point 210 may determine a second location to replace a first location. For example, when access point 210 is located at the first location and stores a first set of baseline measurements and detects a change to the first set of baseline measurements, access point 210 may determine the second location as the location of access point 210. In some implementations, access point 210 may determine the second location utilizing the same technique as is utilized to determine the first location. For example, access point 210 may receive location information identifying the first location and may request and receive location information identifying the second location. Similarly, access point 210 may utilize triangulation to determine the first location and may utilize triangulation to determine the second location. In some implementations, access point 210 may determine the first location using a first technique and the second location using a second technique. For example, access point 210 may receive location information identifying the first location and may utilize triangulation to determine the second location.

In some implementations, access point 210 may determine a confidence metric associated with the location based on a type of location information utilized to determine the location. For example, when access point 210 receives information identifying an address and a room number at which access point 210 is installed, access point 210 may assign a relatively high confidence in the location being accurate. Similarly, when access point 210 determines the location based on GPS information, access point 210 may assign a relatively high confidence in the location being accurate. Alternatively, when access point 210 determines the location based on triangulation, access point 210 may assign a relatively low confidence in the location being accurate. In another example, when access point 210 causes network device 220 to determine the location, access point 210 may assign a particular confidence level based on a proximity of network device 220 to access point 210. In this case, when network device 220 is determined to be within a threshold proximity of access point 210, access point 210 may assign a relatively high confidence in the location being accurate. Alternatively, when network device 220 is determined to exceed the threshold proximity to access point 210, access point 210 may assign a relatively low confidence in the location being accurate.

In some implementations, access point 210 may determine the confidence metric based on a granularity with which the location is determined. For example, when access point 210 receives an address, a floor number, and a room number as location information, access point 210 may assign a relatively high confidence metric. Alternatively, when access point 210 receives only an address, access point 210 may assign a relatively low confidence metric. In another example, access point 210 may assign a particular confidence metric determined based on an accuracy associated with a GPS signal, an accuracy associated with triangulation, or the like. For example, when access point 210 determines the location based on triangulation with a first margin of error, access point 210 may determine a first confidence metric and when access point 210 determines the location based on triangulation with a second margin of error, access point 210 may determine a second confidence metric.

In some implementations, access point 210 may receive a confidence metric from network device 220. For example, when access point 210 utilizes location information identifying a location of network device 220 as location information identifying a location of access point 210, access point 210 may receive a confidence metric from network device 220 identifying an accuracy of the location, and may utilize the confidence metric, a similar confidence metric, or the like. In some implementations, access point 210 may alter the confidence metric. For example, access point 210 may determine a first confidence metric based on triangulation, and may alter the confidence metric to a higher confidence metric after causing maintenance personnel to be deployed to verify the location of access point 210.

In some implementations, access point 210 may store information associating the location with the set of baseline measurements. For example, access point 210 may store information identifying the location, the set of baseline measurements, one or more confidence metrics, or the like via a data structure. Additionally, or alternatively, access point 210 may provide the information associating the location with the set of baseline measurements. For example, access point 210 may provide the information to a network management device associated with managing a network, such as a provisioning management device (e.g., to facilitate network resource provisioning), a tracking management device (e.g., to facilitate equipment security), or the like. In this case, the provisioning management device may be caused to set and/or alter one or more parameters associated with provisioning access point 210. Similarly, the tracking management device may be caused to deploy personnel to verify a location of access point 210, determine a location of access point 210, recover access point 210, or the like.

As further shown in FIG. 4, process 400 may include detecting a threshold change to a baseline measurement of the set of baseline measurements (block 430). For example, access point 210 may monitor a set of measurements to detect the threshold change to the baseline measurement of the set of baseline measurements, such as detecting an alteration to a quantity of neighbor cells, an alteration to a signal strength associated with network device 220, an alteration to a network traffic pattern measurement (e.g., a change to a quantity of connection attempts, a change to a quantity of handover attempts, a change to a cell utilization, etc.), an alteration to a neighbor list, an alteration to a quantity of network devices 220 detected by access point 210, or the like. In some implementations, access point 210 may detect multiple threshold changes to multiple baseline measurements of the set of baseline measurements. For example, access point 210 may determine that a signal strength associated with network device 220 has changed and a quantity of neighbor cells has changed.

In some implementations, access point 210 may determine the threshold based on an expected variability of a baseline measurement. For example, access point 210 may determine that a particular percentage change is to be expected for a signal strength measurement (e.g., as a result of varying field conditions, such as weather, time of day, presence of objects within a particular proximity (e.g., people, chairs, etc.), or the like. In this case, access point 210 may establish the threshold change as an observed change that exceeds the particular percentage change. In this way, access point 210 ensures that variable field conditions do not cause access point 210 to determine that access point 210 has been moved to another location.

In some implementations, access point 210 may weight multiple baseline measurements when detecting the threshold change. For example, access point 210 may apply a first weight to a first baseline measurement and a second weight to a second baseline measurement, and may determine a change metric based on applying the first weight to the first baseline measurement and the second weight to the second baseline measurement. In this case, access point 210 may detect the threshold change based on determining a threshold alteration to the change metric.

In some implementations, access point 210 may determine a change confidence metric. The change confidence metric may refer to a metric associated with a confidence that access point 210 has been moved to another location. For example, access point 210 may determine a difference between a first baseline measurement and a second baseline measurement, and may determine a change confidence metric representing a confidence that access point 210 has been moved from a first location to a second location based on the difference between the first baseline measurement and the second baseline measurement. In this case, access point 210 may detect the threshold change based on determining that the change confidence metric satisfies a threshold.

In some implementations, access point 210 may determine another set of baseline measurements based on detecting the threshold change. For example, access point 210 may determine a first set of baseline measurements associated with a first location, detect a threshold change to the first set of baseline measurements indicating that access point 210 has moved from the first location, and may determine a second set of baseline measurements associated with a second location to which access point 210 has been moved. In this case, access point 210 may associate the second set of baseline measurements with the second location. In this way, access point 210 updates the set of baseline measurements after moving from the first location to the second location.

As further shown in FIG. 4, process 400 may include providing information associated with the set of baseline measurements (block 440). For example, access point 210 may provide information associated with the set of baseline measurements. In some implementations, access point 210 may provide information identifying the location. For example, when network device 220 requests location information from access point 210, access point 210 may provide information identifying the location as a response to the request. In some implementations, access point 210 may provide information identifying a confidence metric associated with the location information. For example, access point 210 may provide information identifying the confidence metric associated with identifying an accuracy of information identifying the location (e.g., the location information), thereby assisting network device 220 in determining whether to utilize the location information in determining a location of network device 220.

In some implementations, access point 210 may provide information identifying the threshold change to the baseline measurement of the set of baseline measurements. For example, access point 210 may provide information indicating that access point 210 has moved from a first location to a second location based on detecting the threshold change to the baseline measurement. In this way, access point 210 triggers a location update for a location associated with access point 210, thereby facilitating maintaining information identifying locations of access points 210.

In some implementations, access point 210 may provide information identifying the threshold change based on identifying a threshold difference between an expected baseline measurement and an observed baseline measurement. For example, when access point 210 receives an expected baseline measurement for an intended location and determines that an observed baseline measurement associated with an actual location differs by a threshold amount, access point 210 may provide information indicating that access point 210 is not installed at the intended location. Alternatively, when access point 210 determines that the observed baseline measurement does not differ from the expected baseline measurement by the threshold amount, access point 210 may provide information indicating that access point 210 is installed at the intended location.

In some implementations, access point 210 may trigger a security alert associated detecting the change to the baseline measurement of the set of baseline measurements. For example, access point 210 may provide a security alert to a tracking management device indicating that access point 210 has moved from the first location, thereby dispatching security personnel to locate access point 210. In this way, access point 210 facilitates equipment security for access point 210. In some implementations, access point 210 may receive an indication that access point 210 is intended to move from the first location to the second location. For example, when maintenance personnel moves access point 210 from the first location to the second location, access point 210 may receive information associated with suppressing a security alert. In this way, access point 210 avoids triggering a false security alert when access point 210 is intended to be moved.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

In this way, access point 210 utilizes a set of baseline measurements to determine when access point 210 has moved from a first location. Moreover, access point 210 provides information associated with the set of baseline measurements, such as location information, security alerts, location updates, or the like.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   determining, by a first device, a first baseline measurement;
   determining, by the first device, a first location associated with the first device;
   storing, by the first device, information identifying the first baseline measurement and information identifying the first location associated with the first device;
   receiving, by the first device, a second baseline measurement from a network device associated with a network;
   determining, by the first device, that the second baseline measurement differs from the first baseline measurement by a threshold quantity;
   determining, by the first device, a second location associated with the first device based on determining that the second baseline measurement differs from the first baseline measurement by the threshold quantity,
   the second location being different from the first location;
   determining, by the first device, a confidence metric, associated with an accuracy of information identifying the second location, based on a proximity of the network device and the first device,
   the confidence metric including a first level when the proximity of the network device and the first device satisfies a threshold proximity, and
   the confidence metric including a second level when the proximity of the network device and the first device fails to satisfy the threshold proximity; and
   providing, by the first device and to a second device, information associated with the second baseline measurement, the information identifying the second location, and the confidence metric.

2. The method of claim 1, further comprising:
   providing information identifying the first location to the second device to cause the second device to set one or more parameters associated with provisioning the first device,
   the information identifying the second location causing the second device to alter the one or more parameters associated with provisioning the first device.

3. The method of claim 1, where the information associated with the second baseline measurement comprises information indicating that the first device is located at the second location.

4. The method of claim 1, where confidence metric is associated with a difference between the first baseline measurement and the second baseline measurement.

5. The method of claim 1, where the first baseline measurement and the second baseline measurement are, respectively, at least one of:
   a first signal strength and a second signal strength,
   a first network traffic level and a second network traffic level,
   a first network traffic pattern and a second network traffic pattern, a first set of detected network devices and a second set of detected network devices, or a first neighbor list and a second neighbor list.

6. The method of claim 1, where the information associated with the second baseline measurement comprises information to trigger verification of the second location.

7. A first device, comprising:
one or more processors to:
determine a first set of baseline measurements,
the first set of baseline measurements relating to a wireless network associated with the first device;
associate the first set of baseline measurements with a first location at which the first device is located;
store information identifying the first set of baseline measurements and information identifying the first location;
receive a second set of baseline measurements from a network device associated with the wireless network;
determine that the second set of baseline measurements differs from the first set of baseline measurements by a threshold quantity;
determine a second location associated with the first device based on determining that the second set of baseline measurements differs from the first set of baseline measurements by the threshold quantity,
the second location being different from the first location;
determine a confidence metric, associated with an accuracy of information identifying the second location, based on a proximity of the network device and the first device,
the confidence metric including a first quantity when the proximity of the network device and the first device satisfies a threshold proximity, and
the confidence metric including a second quantity when the proximity of the network device and the first device fails to satisfy the threshold proximity; and
provide, to a second device, the confidence metric and information indicating that the first device has been moved from the first location to the second location.

8. The first device of claim 7, where the one or more processors are further to:
monitor the second set of baseline measurements to determine a threshold change to a baseline measurement of the second set of baseline measurements.

9. The first device of claim 7, where the one or more processors are further to:
receive a request for location information from the second device; and
provide, to the second device, information identifying the first location and the confidence metric as a response to the request for location information.

10. The first device of claim 7, where the one or more processors are further to:
identify an observed baseline measurement from the second set of baseline measurements;
determine that the observed baseline measurement differs from an expected baseline measurement, of the first set of baseline measurements, by a threshold amount; and
provide, to the second device, information indicating that the first device is located at the second location.

11. The first device of claim 7, where the first set of baseline measurements includes at least one of:
a signal strength measurement,
a network traffic level measurement,
a network traffic pattern measurement,
a set of cell identifiers, or
a neighbor list.

12. The first device of claim 7, where the one or more processors are further to:
perform one or more measurements to determine the first set of baseline measurements.

13. The first device of claim 7, where the one or more processors are further to:
cause one or more network devices to perform a set of measurements; and
receive information identifying the set of measurements based on causing the one or more network devices to perform the set of measurements,
the set of measurements being used to determine the first set of baseline measurements.

14. A non-transitory computer-readable medium storing instructions, the instructions comprising:
one or more instructions that, when executed by one or more processors of a first device, cause the one or more processors to:
receive information identifying a first location,
the first location being a location at which the first device is located;
determine a first set of baseline measurements associated with the first location;
store information identifying the first set of baseline measurements and information identifying the first location;
receive a second set of baseline measurements from a network device associated with a network,
the second set of baseline measurements differing from the first set of baseline measurements by a threshold quantity;
determine a second location associated with the first device based on the second set of baseline measurements differing from the first set of baseline measurements;
store information identifying the second set of baseline measurements and information identifying the second location;
determine a confidence metric associated with an accuracy of the information identifying the second location, based on a proximity of the network device and the first device,
the confidence metric including a first level when the proximity of the network device and the first device satisfies a threshold proximity, and
the confidence metric including a second level when the proximity of the network device and the first device fails to satisfy the threshold proximity; and
provide, to a second device, the information identifying the second set of baseline measurements, the information identifying the second location, and the confidence metric.

15. The non-transitory computer-readable medium of claim 14, where the instructions further comprise:
one or more instructions that, when executed by the one or more processors, cause the one or more processors to:
determine that the second set of baseline measurements differs from the first set of baseline measurements by the threshold quantity; and
generate an alert indicating that the first device has moved from the first location to the second location based on determining that the second set of baseline measurements differs from the first set of baseline measurements by the threshold quantity.

16. The non-transitory computer-readable medium of claim 14, where the instructions further comprise:
one or more instructions that, when executed by the one or more processors, cause the one or more processors to:
receive a message indicating that the first device is to be moved from the first location to the second location;
determine that the second set of baseline measurements differs from the first set of baseline measurements by the threshold quantity; and
suppress triggering an alert regarding the first device being moved from the first location to the second location based on receiving the message.

17. The non-transitory computer-readable medium of claim 14, where the instructions further comprise:
one or more instructions that, when executed by the one or more processors, cause the one or more processors to:
receive information identifying an expected set of baseline measurements,
the expected set of baseline measurements being expected to be observed at the first location;
determine that the first set of baseline measurements correspond to the expected set of baseline measurements; and
provide, to the second device, information indicating that the first device is correctly located at the first location based on determining that the first set of baseline measurements correspond to the expected set of baseline measurements.

18. The non-transitory computer-readable medium of claim 14, where the instructions further comprise:
one or more instructions that, when executed by the one or more processors, cause the one or more processors to:
determine that multiple baseline measurements, of the first set of baseline measurements, differ from a corresponding multiple baseline measurements, of the second set of baseline measurements, by a threshold amount; and
determine that the first set of baseline measurements differs from the second set of baseline measurements by the threshold quantity based on determining that the multiple baseline measurements, of the first set of baseline measurements, differ from the corresponding multiple baseline measurements, of the second set of baseline measurements, by the threshold amount.

19. The non-transitory computer-readable medium of claim 14, where the instructions further comprise:
one or more instructions that, when executed by the one or more processors, cause the one or more processors to:
receive, from the second device, a request for location information; and
provide, to the second device, the information identifying the second location and the confidence metric as a response to the request for location information.

20. The non-transitory computer-readable medium of claim 14, where the instructions further comprise:
one or more instructions that, when executed by the one or more processors, cause the one or more processors to:
receive, from one or more network devices, information identifying one or more respective locations of the one or more network devices; and
determine the second location based on the information identifying the one or more respective locations of the one or more network devices.

* * * * *